(12) United States Patent
Ichikawa et al.

(10) Patent No.: US 7,972,677 B2
(45) Date of Patent: Jul. 5, 2011

(54) PLUGGED HONEYCOMB STRUCTURE

(75) Inventors: Yukihito Ichikawa, Nagoya (JP);
Koichi Ito, Nagoya (JP); Takeshi Tokunaga, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 12/472,838

(22) Filed: May 27, 2009

(65) Prior Publication Data

US 2009/0239031 A1    Sep. 24, 2009

Related U.S. Application Data

(63) Continuation of application No. PCT/JP2008/055922, filed on Mar. 27, 2008.

(30) Foreign Application Priority Data

Mar. 27, 2007  (JP) .................................. 2007-082291

(51) Int. Cl.
*B32B 3/12* (2006.01)
*B01D 39/06* (2006.01)

(52) U.S. Cl. ........................... 428/116; 428/117; 55/523

(58) Field of Classification Search ........................ None
See application file for complete search history.

(56) References Cited

U.S. PATENT DOCUMENTS

| | | | |
|---|---|---|---|
| 5,514,446 A | 5/1996 | Machida et al. | |
| 5,629,067 A | 5/1997 | Kotani et al. | |
| 6,673,414 B2 * | 1/2004 | Ketcham et al. | ............. 428/116 |
| 2005/0011186 A1 | 1/2005 | Saito et al. | |
| 2005/0095179 A1 | 5/2005 | Kasai et al. | |
| 2005/0106356 A1 | 5/2005 | Ikeshima | |
| 2005/0210848 A1 | 9/2005 | Kuki et al. | |
| 2006/0105140 A1 | 5/2006 | Andrewlavage et al. | |
| 2006/0168927 A1 * | 8/2006 | Watanable et al. | ............. 55/523 |
| 2006/0249888 A1 | 11/2006 | Ishihara et al. | |
| 2006/0280905 A1 | 12/2006 | Ichikawa | |
| 2007/0068128 A1 | 3/2007 | Oshimi et al. | |
| 2007/0137158 A1 * | 6/2007 | Sorensen, Jr. | ................... 55/523 |
| 2007/0184241 A1 | 8/2007 | Ichikawa | |

FOREIGN PATENT DOCUMENTS

EP  1 484 483 A1  12/2004

(Continued)

OTHER PUBLICATIONS

May 28, 2010 Office Action for U.S. Appl. No. 12/471,130.

(Continued)

*Primary Examiner* — Gordon R Baldwin
(74) *Attorney, Agent, or Firm* — Oliff & Berridge, PLC

(57) ABSTRACT

There is provided a honeycomb structure including: porous partition walls separating and forming a plurality of cells extending between two end faces, and an outer peripheral wall formed unitarily with the partition walls. The cells include outermost peripheral portion partial cells each locating in an outermost peripheral portion of the honeycomb structure and having an incomplete cell cross section, a part of which is brought into contact with the outer peripheral wall, and complete cells each having a complete cell cross section other than the outermost peripheral portion partial cells. The complete cells and the outermost peripheral portion partial cells having plugging portions formed on one end portion so that an entire end face of the honeycomb structure shows a checkerwise plugging pattern, and the depth of the plugging portions in the outermost peripheral partial cells is smaller than that of the plugging portions in the complete cells.

12 Claims, 5 Drawing Sheets

FOREIGN PATENT DOCUMENTS

| | | |
|---|---|---|
| FR | 2 856 108 | 12/2004 |
| GB | 2 071 640 A | 9/1981 |
| JP | A 56-129042 | 10/1981 |
| JP | A 58-45715 | 3/1983 |
| JP | A-62-294425 | 12/1987 |
| JP | B2 63-12658 | 3/1988 |
| JP | A 5-269388 | 10/1993 |
| JP | A-07-246341 | 9/1995 |
| JP | A-2001-300922 | 10/2001 |
| JP | 2002-336620 | 11/2002 |
| JP | A 2003-260322 | 9/2003 |
| JP | A 2004-154718 | 6/2004 |
| JP | A 2004-154768 | 6/2004 |
| JP | A-2005-144284 | 6/2005 |
| JP | A-2005-270755 | 10/2005 |
| JP | A 2007-21483 | 2/2007 |
| WO | WO 2007/023653 A1 | 3/2007 |

OTHER PUBLICATIONS

Jul. 15, 2010 Supplemental Office Action for U.S. Appl. No. 12/471,130.

Nov. 15, 2010 Notice of Allowance for U.S. Appl. No. 12/471,130.

Apr. 11, 2011 European Search Report issued in EP 08 73 9051.4.

\* cited by examiner

CANNING SURFACE PRESSURE

CANNING SURFACE PRESSURE

CANNING SURFACE PRESSURE

PLUGGED HONEYCOMB STRUCTURE

TECHNICAL FIELD

The present invention relates to a honeycomb structure used for a diesel particulate filter or the like and having cells each having a plugged and portion.

BACKGROUND ART

There has conventionally been used a ceramic honeycomb structure as a diesel particulate filter (DPF) for trapping particulate matter, in particular, diesel particulate matter, in exhaust gas from an automobile.

Generally, such a honeycomb structure has porous partition walls separating and forming a plurality of cells extending between two end faces and an outer peripheral wall formed unitarily with the partition walls and has a structure where a plugging portion is formed in an end portion of each cell in such a manner that an end face and the other end face of the honeycomb structure have complementary checkerwise patterns (see, e.g., Patent Document 1).

FIG. 6 is a plan view partially showing an end face of a honeycomb structure (plugged honeycomb structure) having such plugging portions formed therein, FIG. 7 is a partial cross-sectional view showing an example of a d-d cross-sectional structure of FIG. 6, and FIG. 8 is a partial cross-sectional view showing another example of a d-d cross-sectional structure of FIG. 6. As shown in these figures, in a conventional plugged honeycomb structure 11, the plugging portion 7 formed in the outermost peripheral portion partial cells 5 each locating in the outermost peripheral portion of the honeycomb structure and having an incomplete cell cross section, a part of which is brought into contact with the outer peripheral wall 4, has a depth (length of plugging portions from an end face of the honeycomb structure) equivalent to that of the plugging portion 8 formed in the complete cells each having a complete cell cross section other than the outermost peripheral portion partial cells 5, or the plugging portion 7 formed in the outermost peripheral portion partial cells 5 has a depth larger than that of the plugging portion 8 formed in the complete cells 6 for the purpose of enhancing strength of an edge portion of the honeycomb structure to inhibit damages such as chipping.

When a plugged honeycomb structure is used for a DPF or the like, it is general that the plugged honeycomb structure is compression-fixed (subjected to canning) in a cylindrical tubular body in a state that a holding member of a ceramic fiber mat or the like is wrapped around the outer peripheral wall of the plugged honeycomb structure. As shown in FIG. 8, by the canning, canning surface pressure is applied on the plugged honeycomb structure 11. At this time, if the plugging portions 7 formed in the outermost peripheral portion partial cells 5 has a larger depth of the plugging than the plugging portions 8 formed in the complete cells 6, stress concentrates in a contact portion C between the inner side end portion of the plugging portion 8 formed in the adjacent cell 6 and the partition wall 3 due to action of bending moment generated by the load F in the vicinity of the inner side end portion of the plugging portion 7, and breakage is prone to be caused with the contact portion C being as a breakage starting point. Such a breakage can be caused also when the plugging portions 7 formed in the outermost peripheral portion partial cells 5 has a depth of plugging equivalent to that of the plugging portions 8 formed in the complete cells 6.

Patent Document 1: JP-A-2001-300922

DISCLOSURE OF THE INVENTION

The present invention has been made in view of such conventional circumstances and aims to provide a plugged honeycomb structure which hardly has a breakage due to canning surface pressure loaded on the plugged honeycomb structure when the plugged honeycomb structure is subjected to canning.

In order to achieve the above aim, according to the present invention, there is provided the following plugged honeycomb structure.

[1] A honeycomb structure comprising: porous partition walls separating and forming a plurality of cells extending between two end faces, and an outer peripheral wall formed unitarily with the partition walls; wherein the cells include outermost peripheral portion partial cells each locating in an outermost peripheral portion of the honeycomb structure and having an incomplete cell cross section, a part of which is brought into contact with the outer peripheral wall, and complete cells each having a complete cell cross section other than the outermost peripheral portion partial cells; the complete cells and the outermost peripheral portion partial cells having plugging portions formed on one end portion in such a manner that an entire end face of the honeycomb structure shows a checkerwise plugging pattern, and the depth of the plugging portions in the outermost peripheral partial cells is smaller than that of the plugging portions in the complete cells (first plugged honeycomb structure).

[2] A honeycomb structure comprising: porous partition walls separating and forming a plurality of cells extending between two end faces, and an outer peripheral wall formed unitarily with the partition walls;

wherein the cells include outermost peripheral portion partial cells each locating in an outermost peripheral portion of the honeycomb structure and having an incomplete cell cross section, a part of which is brought into contact with the outer peripheral wall, and complete cells each having a complete cell cross section other than the outermost peripheral portion partial cells; wherein the complete cells have plugging portions in one end portions in such a manner that an end face of the honeycomb structure shows a checkerwise plugging pattern; outermost peripheral portion partial cells having a cell area ratio obtained by the following formula (1) of less than $S_1$ are formed unitarily with the outer peripheral wall so that the cells may be plugged over the entire length thereof; outermost peripheral portion partial cells having the cell area ratio of more than $S_2$ ($S_1 < S_2$) have plugging portions formed to have a depth smaller than that of the plugging portions of the complete cells; and outermost peripheral portion partial cells having the cell area ratio of $S_1$ or more and $S_2$ or less include cells formed unitarily with the outer peripheral wall so that the cells may be plugged over the entire length thereof and cells having plugging portions formed to have a depth smaller than that of the plugging portions of the complete cells (second honeycomb structure).

$$\text{Cell area ratio}(\%) = \text{Area of outermost peripheral portion partial cell}/\text{Area of complete cell} \times 100 \quad (1)$$

[3] A plugged honeycomb structure according to [2], wherein the $S_1$ is below 30(%) (0(%) is excluded), and $S_2$ is 2 to 30(%).

[4] A plugged honeycomb structure according to [2], wherein the $S_1$ is 5(%), and $S_2$ is 30(%).

[5] A plugged honeycomb structure according to any one of [1] to [4], wherein rigidity of the plugging portions is lower than that of the partition walls, and heat capacity of the plugging portions is larger than that of the partition walls.

[6] A plugged honeycomb structure according to any one of [1] to [5], wherein material for the plugging portions is aluminum titanate or a composite material thereof, and material for the partition walls is cordierite or a composite material thereof.

[7] A plugged honeycomb structure according to any one of [1] to [6], wherein thermal conductivity of the plugging portions is lower than that of the partition walls.

[8] A plugged honeycomb structure according to any one of [1] to [7], wherein thermal expansion coefficient of the plugging portions is lower than that of the partition walls.

According to the present invention, there is provided a plugged honeycomb structure excellent in mechanical strength, where a breakage is hardly caused due to a load of canning surface pressure upon canning.

DESCRIPTION OF REFERENCE NUMERALS

1: first plugged honeycomb structure, 2: second plugged honeycomb structure, 3: partition wall, 4: outer peripheral wall, 5: outermost peripheral portion partial cell, 6: complete cell, 7: plugging portion, 8: plugging portion, 11: plugged honeycomb structure

BEST MODE FOR CARRYING OUT THE INVENTION

Hereinbelow, representative embodiments of the present invention of the present invention will specifically be described. However, the present invention is by no means limited to the following embodiments, and it should be understood that modifications, improvements, or the like may suitably be added thereto on the basis of ordinary knowledge of those skilled in the art within the range of not deviating from the gist of the present invention.

Figure 1:
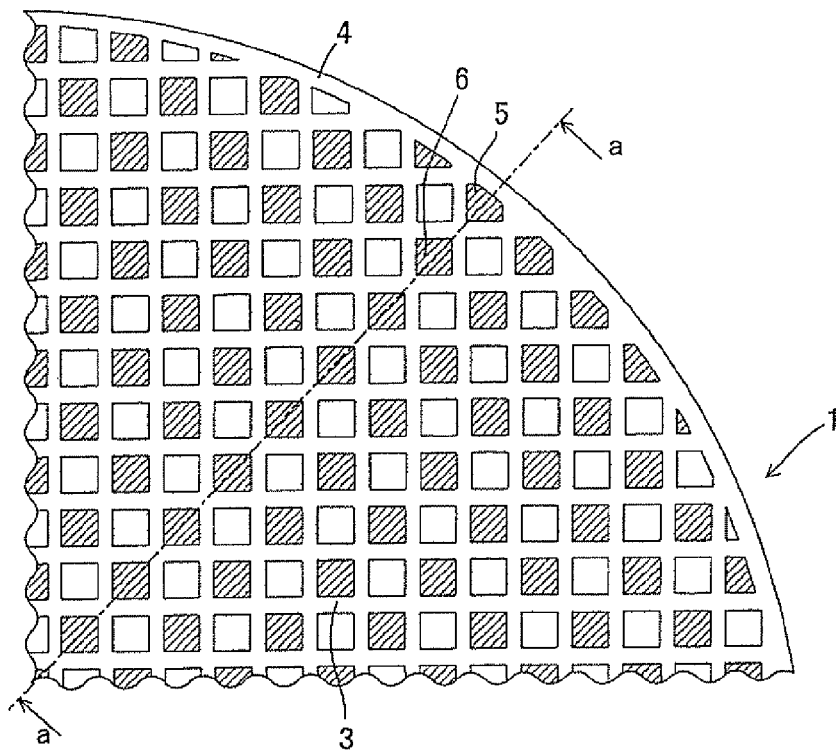
FIG. 1 is a plan view partially showing an end face of the first plugged honeycomb structure of the present invention.
Figure 2:
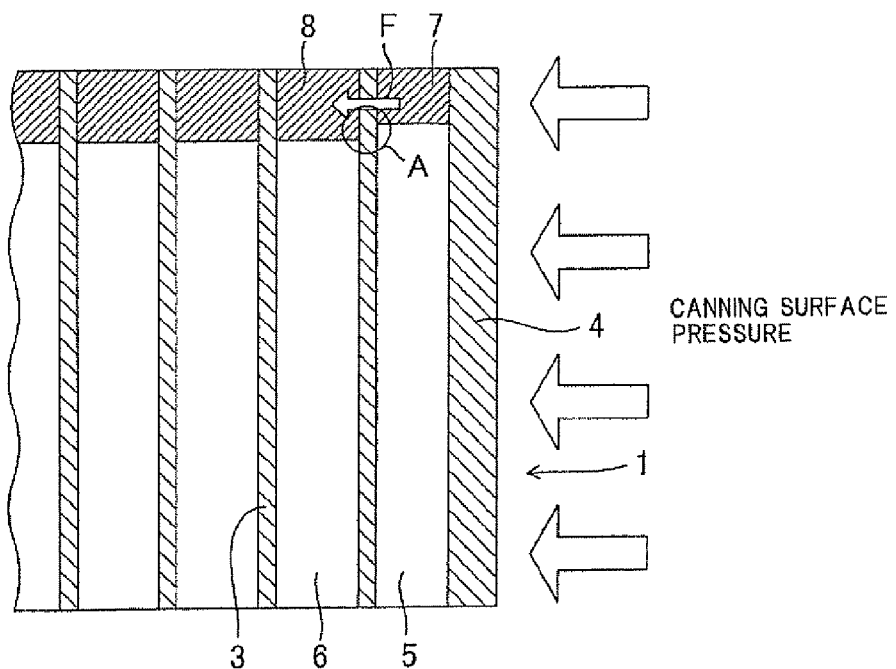
FIG. 2 is a partial cross-sectional view showing an a-a cross-sectional structure of FIG. 1.

FIG. 1 is a plan view partially showing an end face of the first plugged honeycomb structure of the present invention, and FIG. 2 is a partial cross-sectional view showing an a-a cross-sectional structure of FIG. 1.

The first plugged honeycomb structure 1 of the present invention has porous partition walls 3 separating and forming a plurality of cells extending between two end faces and an outer peripheral wall 4 formed unitarily with the partition walls 3. The cells include outermost peripheral portion partial cells 5 each locating in an outermost peripheral portion of the honeycomb structure and having an incomplete cell cross section, a part of which is brought into contact with the outer peripheral wall 4, and complete cells 6 each having a complete cell cross section other than the outermost peripheral portion partial cells 5.

The complete cells 6 and the outermost peripheral portion partial cells 5 have plugging portions formed on one end portion in such a manner that an end face of the honeycomb structure shows a checkerwise plugging pattern like a plugged honeycomb structure conventionally used for a filter such as a DPF. In the first plugged honeycomb structure of the present invention, as a characteristic structure different from a conventional structure, the depth of the plugging portions 7 in the outermost peripheral partial cells 5 is smaller than that of the plugging portions 8 in the complete cells 6.

As described above, when a plugged honeycomb structure is used for a DPF or the like, it is general that the plugged honeycomb structure is compression-fixed (subjected to canning) in a cylindrical tubular body in a state that a holding member of a ceramic fiber mat or the like is wrapped around the outer peripheral wall of the plugged honeycomb structure, and, by the canning, canning surface pressure is loaded on the plugged honeycomb structure.

Here, as the first plugged honeycomb structure 1 of the present invention, when the depth of the plugging portions 7 in the outermost peripheral portion partial cells 5 is smaller than the plugging portions 8 in the complete cells 6, even if a load F is applied in the vicinity of the inner side end portions of the plugging portions 7 formed in the outermost peripheral portion partial cells 5 as shown in FIG. 2, bending moment does not act on the contact portion A between the inner side end portions of the plugging portions 7 and partition walls 3, and stress concentration on the contact portion A is not generated. Therefore, the contact portion A hardly becomes a breakage starting point. Therefore, the first plugged honeycomb structure 1 having a structure as described above is excellent in mechanical strength with hardly causing a breakage due to a load of canning surface pressure upon being subjected to canning.

In the present invention, an important element for improving mechanical strength upon canning is that the depth of each of the plugging portions in the outermost peripheral portion partial cells is relatively small in comparison with the depth of plugging portions in the complete cells present in right inside the outermost peripheral portion partial cells. Therefore, as the first plugged honeycomb structure, a plugged honeycomb structure where the depth of each of the plugging portions in the outermost peripheral portion partial cells is smaller than the depth of each of the plugging portions in the complete cells is the most preferable structure from the viewpoint of mechanical strength. Incidentally, the depth of the plugging portions in the complete cells generally has fluctuations to some extent. In such a case, if the depth of each of the plugging portions in the outermost peripheral portion partial cells is smaller than the average depth of the plugging portions of the complete cells, the aforementioned important element is almost fulfilled in the relation between the outermost peripheral portion partial cells and the complete cells present in right inside the outermost peripheral portion partial cells to be able to exhibit excellent mechanical strength.

Figure 3:
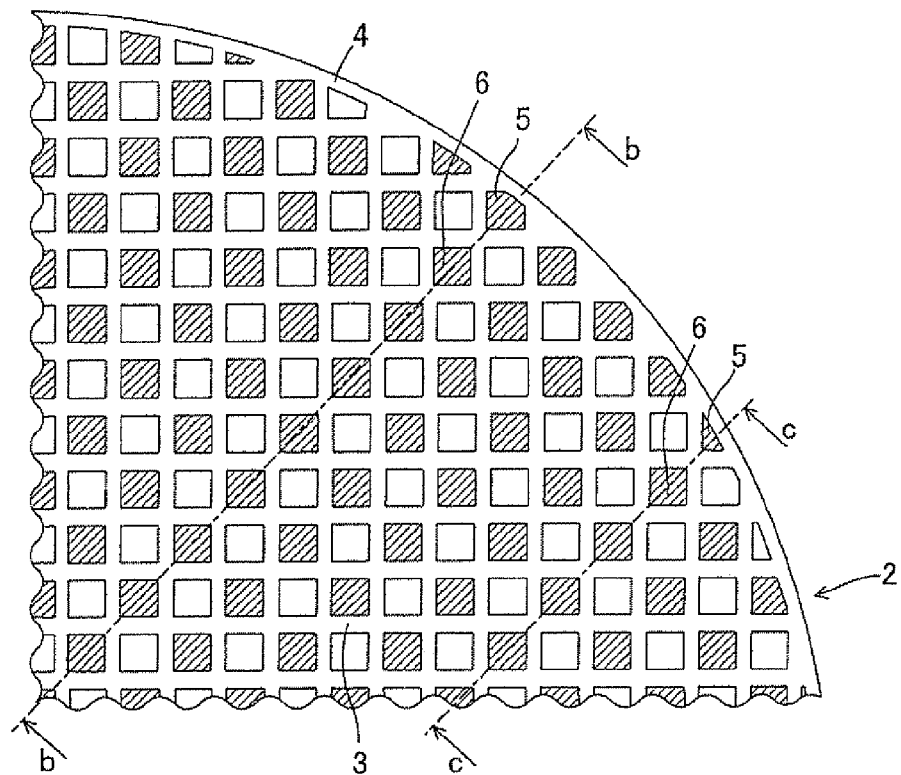
FIG. 3 is a plan view partially showing an end face of the second plugged honeycomb structure of the present invention.
Figure 4:
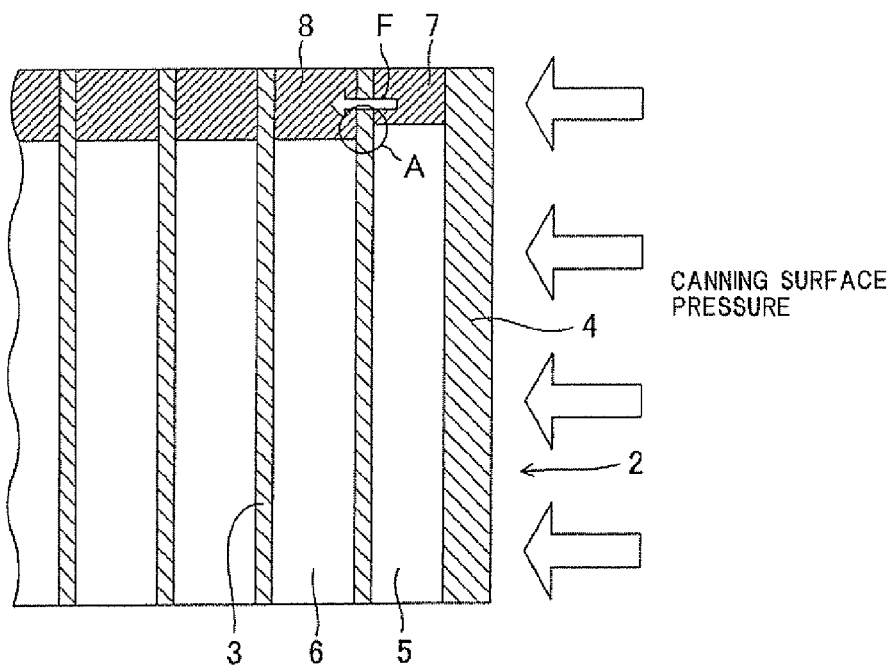
FIG. 4 is a partial cross-sectional view showing a b-b cross-sectional structure of FIG. 3.
Figure 5:
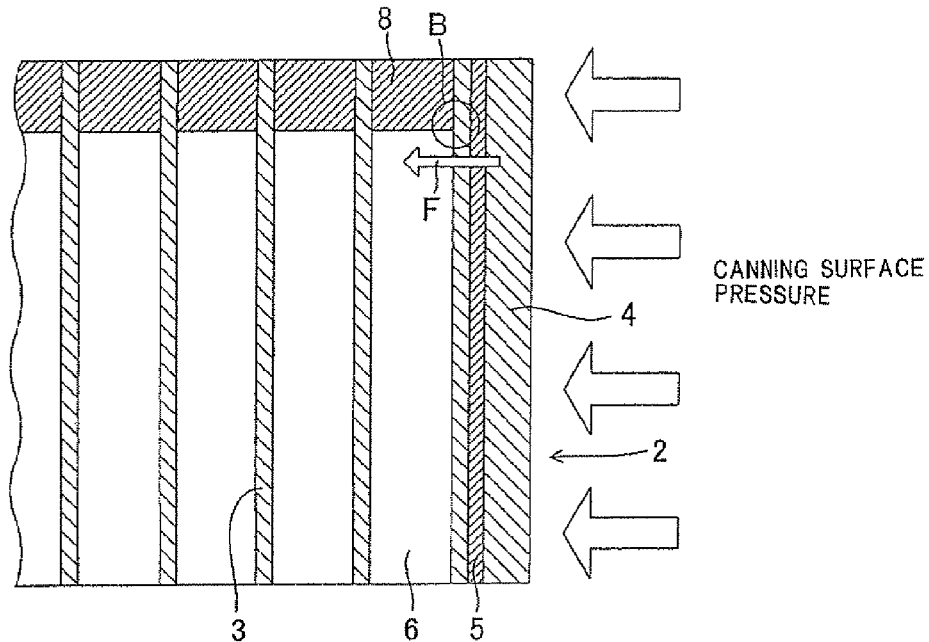
FIG. 5 is a partial cross-sectional view showing a c-c cross-sectional structure of FIG. 3.
Figure 6:
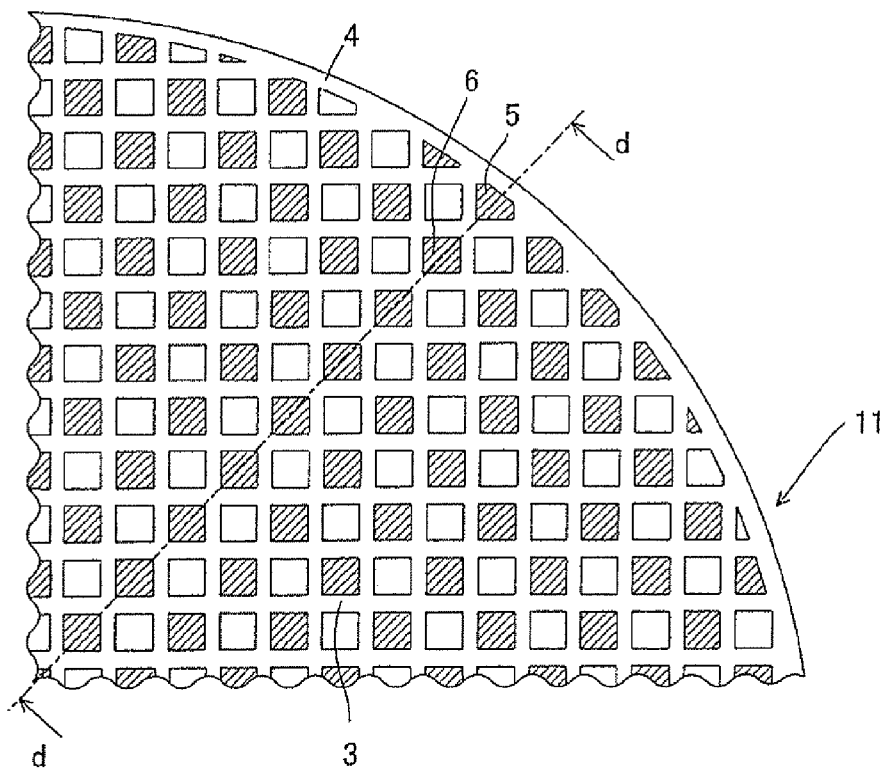
FIG. 6 is a plan view partially showing an end face of a conventional plugged honeycomb structure.
Figure 7:
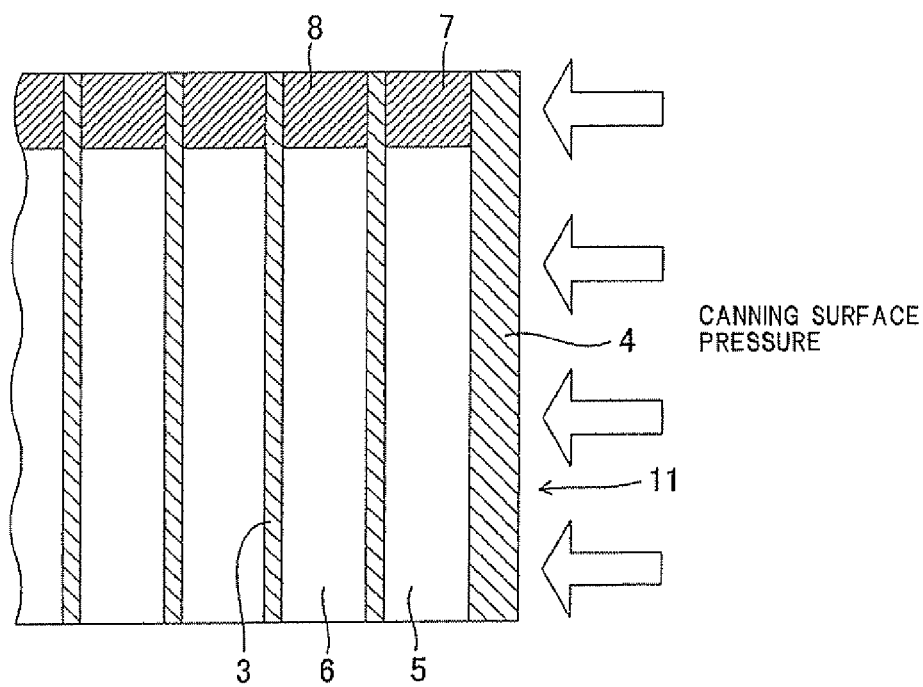
FIG. 7 is a partial cross-sectional view showing an example of a d-d cross-sectional structure of FIG. 6.
Figure 8:
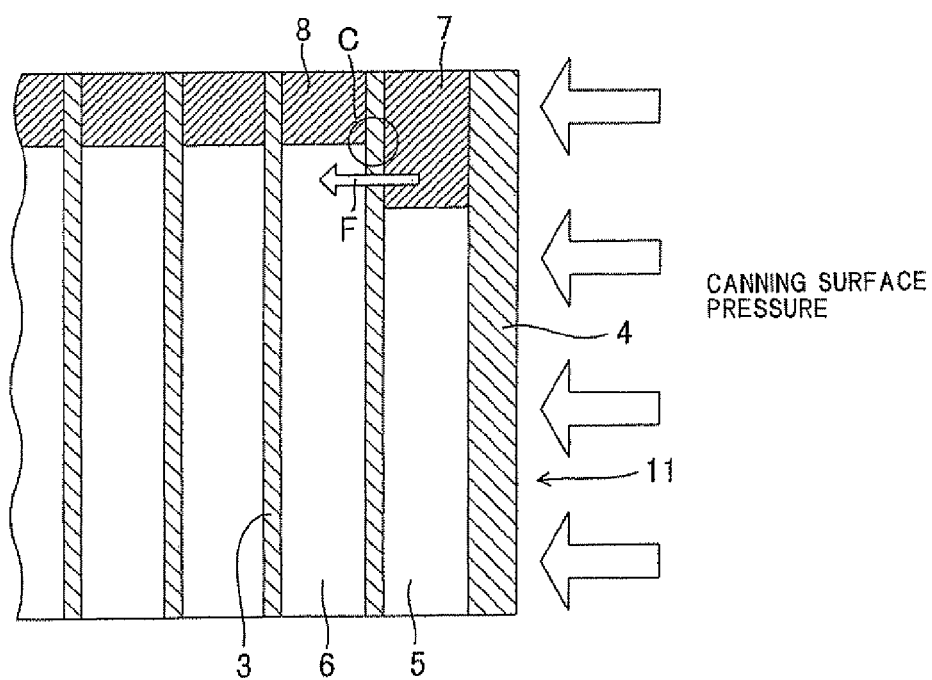
FIG. 8 is a partial cross-sectional view showing another example of a d-d cross-sectional structure of FIG. 6.

FIG. 3 is a plan view partially showing an end face of the second plugged honeycomb structure of the present invention, FIG. 4 is a partial cross-sectional view showing a b-b cross-sectional structure of FIG. 3, and FIG. 5 is a partial cross-sectional view showing a c-c cross-sectional structure of FIG. 3.

Also, the second plugged honeycomb structure 2 of the present invention has the porous partition walls 3 separating and forming a plurality of cells extending between two end faces and the outer peripheral wall 4 formed unitarily with the partition walls 3 like the first honeycomb structure 1 described above. The cells include the outermost peripheral portion partial cells 5 each locating in an outermost peripheral portion of the honeycomb structure and having an incomplete cell cross section, a part of which is brought into contact with the outer peripheral wall, and complete cells 6 each having a complete cell cross section other than the outermost peripheral portion partial cells 5.

In the second plugged honeycomb structure 2 of the present invention, the complete cells 6 have plugging portions 8 formed on one end portion in such a manner that each of the end faces of the honeycomb structure shows a checkerwise plugging pattern like a plugged honeycomb structure conventionally used for a filter such as a DPF.

On the other hand, the outermost peripheral portion partial cells 5 are subjected to different treatments depending on cell area ratio obtained by the following formula (1):

Cell area ratio(%)=Area of outermost peripheral portion partial cell/Area of complete cell×100 (1)

That is, as shown in FIG. 5, the outermost peripheral portion partial cells 5 whose cell area ratios obtained by the above formula (1) are lower than a certain value $S_1$ are formed unitarily with the outer peripheral wall 4 so as to be plugged over the entire length.

In addition, as shown in FIG. 4, in the outermost peripheral portion partial cells 5 whose cell area ratios are higher than a certain value $S_2$ ($S_1<S_2$), the plugging portions 7 whose depth is smaller than that of the complete cells 6 are formed in one end portion thereof according to the plugging pattern described above.

Further, the outermost peripheral portion partial cells 5 whose cell area ratio is $S_1$ or more and $S_2$ or less include both the cells formed unitarily with the outer peripheral wall 4 so as to be plugged over the entire length and the cells having plugging portions 7 whose depth is smaller than that of the complete cells 6 in one end portion thereof according to the plugging pattern described above.

Thus the various treatments are given according to the cell area ratio because the outermost peripheral portion partial cells have irregular shapes lacking a part thereof in comparison with the complete cells. In the cells having particularly small cell area ratio, it is difficult to form a plugging portion in an end portion, and the formation of the plugging portions requires time and labor.

If only inhibition of a breakage upon canning is taken into consideration, it is desirable that all the outermost peripheral portion partial cells requiring plugging have plugging portions whose depth is smaller than that of the plugging portions of the complete cells. However, when also productivity is taken into consideration, it is favorable that the outermost peripheral portion partial cells having small cell area ratios and difficulty in forming plugging portions are formed unitarily with the outer peripheral wall so as to be plugged over the entire length. Such unitary formation with the outer peripheral wall can be performed relatively easily by, for example, adjusting a structure of a die to be used upon extrusion forming a honeycomb structure.

Therefore, in the second plugged honeycomb structure 2 of the present invention, in the outermost peripheral portion partial cells 5 which have relatively high cell area ratio to be able to easily form plugging portions, plugging portions 7 having a depth smaller than that of the plugging portions 8 of the complete cells 8 are formed to try to inhibit a breakage upon canning. The outermost peripheral portion partial cells 5 having difficulty in forming plugging portions because of relatively low cell area ratio are formed unitarily with the outer peripheral wall 4 to try to improve productivity. Further, in the outermost peripheral portion partial cells 5 having cell area ratios where the difficulty in forming plugging portions is moderate, both the cells having plugging portions 7 having small depth and the cells formed unitarily with the outer peripheral wall 4 are present.

As shown in FIG. 4, in each of the outermost peripheral portion partial cells 5 having a plugging portion 7 formed in an end portion so that the depth is smaller than that of the plugging portions 8 of the complete cells 6, even if a load F is applied in the vicinity of inner side end portion of the plugging portion 7, bending moment does not act on the contact portion A between the inner side end portion of the plugging portion 7 and the partition wall 3, and stress concentration on the contact portion A is not generated. Therefore, the contact portion A hardly becomes a breakage starting point.

On the other hand, as shown in FIG. 5, in each of the outermost peripheral portion partial cells 5 formed unitarily with the outer peripheral wall 4 so as to be plugged over the entire length, stress is prone to concentrate on the contact portion B between the inner side end portion of the plugging portion 8 formed in an adjacent complete cell 6 and the partition wall 3 due to action of bending moment generated by the load F applied on the outermost peripheral portion partial cells 5. However, in the second plugged honeycomb structure 2, by limiting the outermost peripheral portion partial cells 5 formed unitarily with the outer peripheral wall 4 to the small cells having a certain cell area ratio or less, the load F is reduced to decrease stress concentration, thereby inhibiting the contact portion B from serving as a breakage starting point upon canning.

In the second honeycomb structure of the present invention, the cell area ratio $S_1$ is preferably 30(%) or less, more preferably 10(%) or less, and furthermore preferably 5(%) or less (0(%) is excluded). When the cell area ratio $S_1$ is more than 30(%), the cells where plugging is somewhat easy may be unitarily formed with the outer peripheral wall, which may reduce a breakage inhibition effect upon canning.

In addition, the cell area ratio $S_2$ is preferably 2 to 30(%), more preferably 2 to 10(%), furthermore preferably 2 to 5(%). When the cell area ratio $S_2$ is less than 2(%), the outermost peripheral portion partial cells having difficulty in forming plugging portions may have to be plugged, which may decrease productivity. On the other hand, when the cell area ratio $S_2$ is more than 30(%), the cells where plugging is somewhat easy may be unitarily formed with the outer peripheral wall, which may reduce a breakage inhibition effect upon canning.

An example of a particularly preferable embodiment from the viewpoint of achieving a balance between the breakage inhibition effect upon canning and the productivity is a constitution of the cell area ratio $S_1$ of 5(%) and the cell area ratio $S_2$ of 30(%).

As a method for forming plugging portions having different depths (lengths) when the first plugged honeycomb structure and the second plugged honeycomb structure of the present invention are manufactured, the following method may be employed. Generally, when the plugging portions are formed in a honeycomb structure, after attaching a sheet on an end face of the honeycomb structure, holes are made in portions corresponding with the cells to be plugged of the sheet, the end face having the sheet attached thereon of the honeycomb structure is immersed in plugging slurry prepared by slurring a plugging material to fill the plugging slurry into the end portions of the cells to be plugged through the holes, and then, dried and/or fired to harden the plugging slurry filled to obtain the plugging portions. When holes are made in the sheet, the plugging depth can be varied by changing the hole size. Generally, the larger the hole size is, the deeper the plugging slurry is filled into the cell to form a deeper plugging portion.

In addition, as a method for forming predetermined outermost peripheral portion partial cells unitarily with the outermost peripheral wall when the second plugged honeycomb structure of the present invention is manufactured, the following method may be employed. Generally, a honeycomb structure is formed by extrusion forming using an extrusion-forming die having a large number of cell blocks for forming cells. By eliminating the cell blocks forming the outermost peripheral portion partial cells in the extrusion-forming die, kneaded clay enters the eliminated portion upon extrusion to unitarily form the outermost peripheral portion partial cells and the outer peripheral wall.

In the first plugged honeycomb structure and the second plugged honeycomb structure of the present invention, the material for the honeycomb structure main body except for the plugging portions is not particularly limited. For example, when the honeycomb structure is used in high temperature environment as a DPF, it is preferable that the honeycomb structure is constituted of a material excellent in heat resistance as cordierite. In addition, a material for the plugging portions is preferably the same material as that for the honeycomb structure main body in order to suppress the difference in thermal expansion from the honeycomb structure main body.

In addition, in the first plugged honeycomb structure and the second plugged honeycomb structure of the present invention, it is preferable that rigidity of the plugging portions is lower than that of the partition walls, that heat capacity of the plugging portions is larger than that of the partition walls, that thermal conductivity of the plugging portions is lower than that of the partition walls, and that thermal expansion coefficient of the plugging portions is lower than that of the partition walls. In order to obtain such relations, different materials may be used for the partition walls and the plugging portions.

If rigidity of the plugging portions is made lower than that of the partition walls, when canning surface pressure is applied to deform the partition walls, the plugging portions also deform by following the deformation of the partition walls. Therefore, partial stress concentration is relaxed, thereby hardly causing a breakage.

Incidentally, in order to continuously use a plugged honeycomb structure as a DPF for a long period of time, a periodic regeneration treatment is required. That is, in order to get the filter performance back to the initial state by reducing the pressure loss increased by the particulate matter accumulating inside the filter with time, it is necessary to combust the particulate matter accumulating inside the filter. Upon the filter regeneration, high thermal stress generates in the end portions having plugging portions formed therein, and a defect such as a crack, a breakage, and the like may be caused in the honeycomb structure by the thermal stress. However, when the rigidity of the plugging portions is made lower than that of the partition walls, the thermal stress is relaxed to suppress generation of a defect.

Further, when the heat capacity of the plugging portions is made larger than that of the partition walls, temperature rise due to combustion of particulate matter upon the regeneration treatment is suppressed by a heat storage effect of the plugging portions. Therefore, melt of a partition wall or generation of a crack due to excessive temperature rise can effectively be inhibited.

In addition, when the thermal conductivity of the plugging portions is made lower than that of the partition walls, heat generating upon combustion of particulate matter is stored in the plugging portions. This makes temperature change in the end portions of the honeycomb structure gradual to inhibit thermal crack generation.

Furthermore, when the thermal expansion coefficient of the plugging portions is made lower than that of the partition walls, even if the plugging portion has high temperature due to the heat storage effect, crack generation in a partition wall can be inhibited by the difference in thermal expansion between the plugging portions and the partition walls. It is preferable that the thermal expansion coefficient of the plugging portions is made smaller than that of the partition walls in any direction of the cross-sectional directions perpendicular to the cell passage directions.

In the case that the relations of rigidity, heat capacity, thermal conductivity, and thermal expansion coefficient are tried to be satisfied as described above with respect to the plugging portions and the partition walls, it is preferable that cordierite or a composite material thereof is used as a material for the partition walls and that aluminum titanate (hereinbelow referred to as "AT") or a composite material thereof is used as a material for the plugging materials.

It is preferable that, as a material for plugging portions, AT contains, especially 60% or more of AT as a crystal phase, and its other crystal phases which are constituted of at least one of rutile, corundum, and mullite and 5% or less of glass phase.

The Young's modulus of AT is about ¹/₁₀ of that of cordierite. Since the Young's modulus of AT decreases in accordance with increase in the AT crystal amount, the larger the AT crystal amount is, the more preferable. Further, since the Young's modulus of AT decreases in accordance with increase in the AT average crystal grain size, the larger the AT average crystal grain size is, the more preferable. The AT Young's modulus changes depending on the AT crystal amount, AT average crystal grain size, and porosity and is about 0.1 to 50 GPa. From the viewpoint of heat cycle durability, the average crystal grain size is preferably less than 10 μm. However, since the plugging portions generally have sufficient thickness in comparison with the partition walls, emphasis is not necessarily put on the heat cycle durability. Therefore, when AT material is used for the plugging portions, the AT average crystal grain size may be 10 μm or more, which is rather convenient because a Young's modulus of the plugging portions can be reduced. However, from the viewpoint of deterioration in compression strength of the material, the average crystal grain size is preferably less than 100 μm.

Incidentally, specific heat of cordierite is almost the same as that of AT, and it is about 500 to 1000 J/kgK. Since heat capacity [J/K] is the product of mass [kg] and specific heat [J/kgK], heat capacity per unit volume [J/m³K] is expressed as the product of true specific gravity (density) [kg/m³] and specific heat [J/kgK]. Since the true specific gravity of AT is about 3.6, while the true specific gravity of cordierite is about 2.5; if the porosity is equivalent, heat capacity of AT is 1.44 times that of cordierite.

Generally, when porosity increases, strength and Young's modulus tend to decrease. Therefore, by making the porosity of AT smaller than that of cordierite, the Young's modulus of AT is increased. However, since the Young's modulus of AT is as small as about a tenth of that of cordierite by its nature, even if the porosity is lowered, it shows the Young's modulus which is sufficiently smaller than that of cordierite. Therefore, by making the porosity of AT smaller than that of cordierite, characteristics of larger heat capacity and smaller Young's modulus than those of cordierite are exhibited.

Further, since the thermal expansion coefficient and thermal conductivity of AT decrease in accordance with increase of AT crystal amount, the larger the AT crystal amount is, the more preferable, and the AT crystal amount is preferable 60% or more. The thermal expansion coefficient (40 to 800° C.) of AT is about $-2.0\times10^{-6}/°$ C. to $4.0\times10^{-6}/°$ c. The thermal conductivity of AT is about 3.0 W/mK or less. Though thermal conductivity of cordierite is about 1.0 W/mk or less, thermal conductivity can be made smaller than that of cordierite by increasing the AT crystal amount of AT. In the case of a honeycomb structure of cordierite, the thermal expansion coefficient (A axis) at 40 to 800° C. is generally $1.5\times10^{-6}/°$ C. or less. Since aluminum titanate has the Young's modulus lower than that of cordierite, AT of the plugging portions may have higher thermal expansion than cordierite of the partition walls. However, by allowing AT to have lower thermal expansion, stress at the interface between the partition wall and the plugging portion can be reduced further, which is preferable.

A shape of a honeycomb structure is not particularly limited in the present invention. For example, as a cross-sectional shape perpendicular to the central axis of a columnar structure of a honeycomb structure, any shape such as a polygon such as a rectangle, a circle, an ellipse, and an oval can be employed. In addition, a cross-sectional shape of a cell is not particularly limited, either, and a triangle, a rectangle, a hexagon, an octagon, a circle, or a combination of these shapes may be employed.

When the honeycomb structure is used as a filter such as a DPF, the thickness of the partition walls of the honeycomb structure is preferably 100 to 2000 μm, more preferably 200 to 1000 μm, and particularly preferably 300 to 700 μm. When the thickness of the partition walls is less than 100 μm, strength is insufficient, and thermal shock resistance may be lowered. On the other hand, when the thickness of the partition walls is more than 2000 μm, pressure loss tends to increase.

The cell density of the honeycomb structure is preferably 20 to 600 cells/in² (cpsi), more preferably 50 to 400 cpsi, particularly preferably 100 to 300 cpsi. When the cell density is less than 20 cpsi, the contact efficiency with exhaust gas tends to be insufficient. On the other hand, when the cell density is more than 600 cpsi, the pressure loss tends to increase. Incidentally, "cpsi" stands for "cells per square inch", which is a unit representing the cell number per 1 inch². For example, 10 cpsi is about 1.55 cells/cm².

The porosity of the honeycomb structure is preferably 30 to 90%, more preferably 45 to 80%, particularly preferably 50 to 70%. By the porosity of 30 to 90%, pressure loss can be reduced, and mechanical strength as a structure can be maintained.

The average pore size of the honeycomb structure is preferably 5 to 500 μm. When the average pore size is less than 5 μm, the pressure loss tends to increase. On the other hand, when the average pore size is more than 500 μm, the trapping efficiency tends to be lowered when the structure is used as a filter.

Though the application of the plugged honeycomb structure of the present invention is not particularly limited, the structure can suitably be used as the plugged honeycomb structure subjected to canning, particularly, for a filter such as a DPF.

EXAMPLE

Hereinbelow, the present invention will be described in more detail on the basis of Examples. However, the present invention is by no means limited to these Examples.

Example 1

There was manufactured a plugged honeycomb structure having plugging portions in one end portion of each of the outermost peripheral portion partial cells and the complete cells in such a plugging pattern that the end portions of the honeycomb structure show a checkerwise pattern with the depth of the plugging portions in the complete cells being 3 mm or more and the depth of the plugging portions in the outermost peripheral portion partial cells being less than 3 mm. Incidentally, the material for the plugging portions is cordierite, which is the same as that of the honeycomb structure main body. The plugged honeycomb structure was subjected to measurement of isostatic fracture strength, a mandatory regeneration test, and a quick heating and quenching test by the methods described later.

Example 2

There was manufactured a honeycomb structure where, in an end portion of each the complete cells of a honeycomb structure main body which is the same as the one used as in Example 1, a plugging portion having a depth of 3 mm or more in such a plugging pattern that the end faces of the honeycomb structure show a checkerwise pattern was formed; the outermost peripheral portion partial cells having a cell area ratio obtained from the aforementioned formula (1) of less than 5% of the honeycomb structure main body were formed unitarily with the outer peripheral wall so as to be plugged over the entire length; in the outermost peripheral portion partial cells having a cell are ratio of more than 30%, a plugging portion having a depth of less than 3 mm was formed in an end portion according to the aforementioned plugging pattern; and the outermost peripheral portion partial cells having a cell area ratio of 5% or more and 30% or less included both the cells formed unitarily with the outer peripheral wall so as to be plugged over the entire length and the cells each having a plugging portion a depth of less than 3 mm formed in an end portion according to the aforementioned plugging pattern. Incidentally, the material for the plugging portions was cordierite, which was the same as that for the honeycomb structure main body. The plugged honeycomb structure was subjected to measurement of isostatic fracture strength, a mandatory regeneration test, and a quick heating and quenching test by the methods described later.

Comparative Example 1

There was manufactured a plugged honeycomb structure having a plugging portion having a depth of 3 mm in an end portion of each of the outermost peripheral portion partial cells and the complete cells of a honeycomb structure main body which was the same as that used in Example 1 in such a manner that the end faces of the honeycomb structure show a checkerwise pattern. Incidentally, the material for the plugging portions was cordierite, which was the same as that for the honeycomb structure main body. The plugged honeycomb structure was subjected to measurement of isostatic fracture strength, a mandatory regeneration test, and a quick heating and quenching test by the methods described later.

Comparative Example 2

There was manufactured a plugged honeycomb structure having a plugging portion having a depth of 3 mm in an end portion of each of the complete cells and 5 mm in an end portion of each of the outermost peripheral portion partial cells of a honeycomb structure main body which was the same as that used in Example 1 in such a manner that the end faces of the honeycomb structure show a checkerwise pattern. Incidentally, the material for the plugging portions was cordierite, which was the same as that for the honeycomb structure main body. The plugged honeycomb structure was subjected to measurement of isostatic fracture strength, a mandatory regeneration test, and a quick heating and quenching test by the methods described later.

Example 3

There was manufactured the same plugged honeycomb structure as in Example 1 except that the plugging portions are formed of a material containing AT as the main component (AT content: 90 mass %). The plugged honeycomb structure was subjected to a mandatory regeneration test and a quick heating and quenching test by the methods described later.

Example 4

There was manufactured the same plugged honeycomb structure as in Example 2 except that the plugging portions are formed of a material containing AT as the main component (AT content: 90 mass %). The plugged honeycomb structure was subjected to a mandatory regeneration test and a quick heating and quenching test by the methods described later.

(Measurement of Isostatic Fracture Strength)

Figure 9:
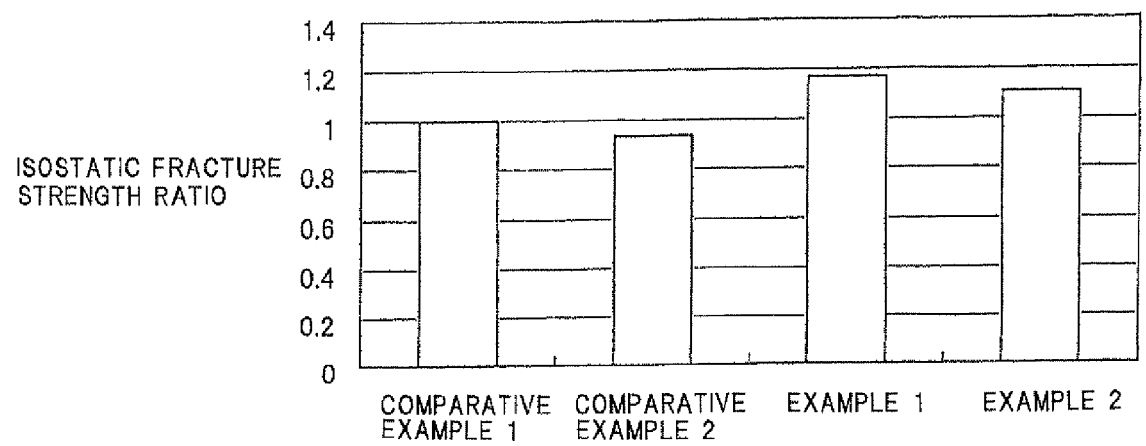
FIG. 9 is a graph showing results of Examples and Comparative Examples.

Each of the plugged honeycomb structures was put in a rubber cylindrical container, which was covered with an aluminum plate to perform isotropic pressure compression. The pressure compression value (isostatic fracture strength) when the plugged honeycomb structure was fractured was measured. The graph in FIG. 9 shows the results of the measurement by a relative strength ratio with the aforementioned measurement value of Comparative Example 1 as 1.

As shown in the graph, Example 1, which is an example of the first plugged honeycomb structure of the present invention, and Example 2, which is an example of the second plugged honeycomb structure of the present invention, exhibited high isostatic fracture strength in comparison with Comparative Example 1, where the plugged portions of all the cells have the same depth, and Comparative Example 2, where the depth of the plugging portions formed in the outermost peripheral portion partial cells is larger than that of the plugging portions formed in the complete cells.

(Mandatory Regeneration Test)

Each of the plugged honeycomb structure was disposed in a soot generator. Burner exhaust gas of about 200° C. was introduced into the plugged honeycomb structure to allow soot to accumulate (be trapped) inside the plugged honeycomb structure. After the soot accumulation amount was thus increased sequentially within the range from 5 to 15 g/L per unit capacity of the plugged honeycomb structure, exhaust gas at 650 to 700° C. was introduced into the plugged honeycomb structure to perform a mandatory regeneration test where accumulating soot was combusted. The soot generator used above was provided with a combustion chamber capable of generating a large amount of soot by combusting gas oil therein, a passage where combusted gas and soot generating in the combustion chamber pass, and a test chamber communicating with the passage, having the plugged honeycomb structure disposed therein, and capable of allowing a large amount of soot to accumulate on the honeycomb structure in a short period of time. Fuel is supplied to the combustion chamber, and a flowmeter is disposed therein so that air or oxygen can be supplied as necessary. In addition, a flowmeter is disposed in the passage so that air or oxygen and nitrogen can be supplied as necessary. In the test chamber, a thermocouple for measuring temperature which is connected with a recorder and a pressure gauge for measuring inner pressure of the test chamber are disposed. In addition, the test chamber is connected to an exhaust air duct where gas flowed in from the passage and passed through the plugged honeycomb structure is discharged. The temperature of the test chamber when soot is allowed to accumulate by introducing exhaust gas into the plugged honeycomb structure is about 200° C., and the gas flow rate was 9 Nm$^3$/min. The soot generation amount at this time was about 90 g per hour. The exhaust gas flow rate at 650 to 700° C. when soot accumulating on the plugged honeycomb structure was combusted was 1.5 Nm$^3$/min.

When the soot accumulation amount before performing the mandatory regeneration treatment is sequentially increased, melt is generated in a part of the partition walls in the vicinity of the plugging portions on the exhaust gas outlet side of the plugged honeycomb structure at a certain soot accumulation amount due to combustion heat of soot upon the mandatory regeneration treatment. When the melt is generated, the larger the soot accumulation amount is, the higher the melting resistance of the plugged honeycomb structure, which is preferable.

As a result of subjecting each of the plugged honeycomb structures in Examples 1 to 4 and Comparative Examples 1 and 2 to this test, the honeycomb structures in Examples 3 and 4, where the plugging portions were formed of a material containing AT as the main component, had a large soot accumulation amount when melting was caused and showed high melting resistance in comparison with the plugged honeycomb structures in Examples 1 and 2 and Comparative Examples 1 and 2, where the plugging portions were formed of cordierite.

(Quick Heating and Quenching Test)

Each of the plugged honeycomb structures was disposed in a burner using LPG as its fuel, and quick heating and quenching at 100 to 700° C. was repeated. In this test, when the cycle number of quick heating and quenching is increased, a crack is generated in a part of the partition walls in the vicinity of the plugging portions on the exhaust gas inlet side of the plugged honeycomb structure at a certain cycle number. The larger the cycle number when the crack is caused is, the higher the thermal shock resistance of the plugged honeycomb structure is, which is preferable.

As a result of subjecting each of the plugged honeycomb structures in Examples 1 to 4 and Comparative Examples 1 and 2 to this test, the honeycomb structures in Examples 3 and 4, where the plugging portions were formed of a material containing AT as the main component, had a large cycle number when a crack was caused and showed high thermal shock resistance in comparison with the plugged honeycomb structures in Examples 1 and 2 and Comparative Examples 1 and 2, where the plugging portions were formed of cordierite.

INDUSTRIAL APPLICABILITY

The present invention can suitably be used for a plugged honeycomb structure which is canned upon use such as a DPF.

The invention claimed is:

1. A honeycomb structure comprising:
porous partition walls separating and forming a plurality of cells extending between two end faces, and
an outer peripheral wall formed unitarily with the partition walls;
wherein the cells include outermost peripheral portion partial cells each located in an outermost peripheral portion of the honeycomb structure and having an incomplete cell cross section, a part of which is brought into contact with the outer peripheral wall, and complete cells each having a complete cell cross section other than the outermost peripheral portion partial cells,
the complete cells and the outermost peripheral portion partial cells having plugging material formed on one end portion in such a manner that an entire end face of the honeycomb structure shows a checkerwise plugging pattern,
a length of the plugging material in the outermost peripheral partial cells is smaller than a length of the plugging material in the complete cells,
some of the outermost peripheral portion partial cells are formed unitarily with the outer peripheral wall so as to be plugged over the entire length thereof,
the length of the plugging material of each partial cell is based on a cell area ratio, and
the cell area ratio is determined based on an equation in which the cell area ratio (%)=Area of outermost peripheral portion partial cell/Area of complete cell×100.

2. A honeycomb structure comprising:
porous partition walls separating and forming a plurality of cells extending between two end faces, and
an outer peripheral wall formed unitarily with the partition walls;
wherein the cells include outermost peripheral portion partial cells each located in an outermost peripheral portion of the honeycomb structure and having an incomplete cell cross section, a part of which is brought into contact with the outer peripheral wall, and complete cells each having a complete cell cross section other than the outermost peripheral portion partial cells,
the complete cells have plugging portions in one end portion in such a manner that an end face of the honeycomb structure shows a checkerwise plugging pattern,
the outermost peripheral portion partial cells that have a cell area ratio obtained by the following formula (1) of less than a first cell area ratio $S_1$ include plugging portions formed unitarily with the outer peripheral wall so that the cells may be plugged over the entire length thereof,
the outermost peripheral portion partial cells that have the cell area ratio of more than a second cell area ratio $S_2(S_1<S_2)$ include plugging portions formed to have a depth smaller than that of the plugging portions of the complete cells, and
the outermost peripheral portion partial cells that have the cell area ratio of $S_1$ or more and $S_2$ or less include cells with plugging portions that are formed unitarily with the outer peripheral wall so that the cells may be plugged over an entire length thereof and cells with plugging portions formed to have a depth smaller than that of the plugging portions of the complete cells Cell area ratio(%)=Area of outermost peripheral portion partial cell/Area of complete cell×100     (1).

3. A plugged honeycomb structure according to claim 2, wherein the $S_1$ is below 30(%) (0(%) is excluded), and $S_2$ is 2 to 30(%).

4. A plugged honeycomb structure according to claim 2, wherein the $S_1$ is 5(%), and $S_2$ is 30(%).

5. A plugged honeycomb structure according to claim 1, wherein rigidity of the plugging material is lower than that of the partition walls, and heat capacity of the plugging material is larger than that of the partition walls.

6. A plugged honeycomb structure according to claim 1, wherein material for the plugging material is aluminum titanate or a composite material thereof, and material for the partition walls is cordierite or a composite material thereof.

7. A plugged honeycomb structure according to claim 1, wherein thermal conductivity of the plugging material is lower than that of the partition walls.

8. A plugged honeycomb structure according to claim 1, wherein thermal expansion coefficient of the plugging material is lower than that of the partition walls.

9. A plugged honeycomb structure according to claim 2, wherein rigidity of the plugging portions is lower than that of the partition walls, and heat capacity of the plugging portions is larger than that of the partition walls.

10. A plugged honeycomb structure according to claim 2, wherein material for the plugging portions is aluminum titanate or a composite material thereof, and material for the partition walls is cordierite or a composite material thereof.

11. A plugged honeycomb structure according to claim 2, wherein thermal conductivity of the plugging portions is lower than that of the partition walls.

12. A plugged honeycomb structure according to claim 2, wherein thermal expansion coefficient of the plugging portions is lower than that of the partition walls.

* * * * *